US005575459A

United States Patent [19]
Anderson

[11] Patent Number: 5,575,459
[45] Date of Patent: Nov. 19, 1996

[54] LIGHT EMITTING DIODE LAMP

[75] Inventor: Robert A. Anderson, Burlington, Canada

[73] Assignee: Uniglo Canada Inc., Stoney Creek, Canada

[21] Appl. No.: 429,552

[22] Filed: Apr. 27, 1995

[51] Int. Cl.$^6$ .................................................... F21V 3/00
[52] U.S. Cl. ........................ 362/240; 362/226; 362/250; 362/800; 313/318.03; 313/500; 313/512; 315/185 R; 439/615
[58] Field of Search ........................ 439/339, 605, 439/611, 615; 313/318.03, 318.09, 500, 501, 512; 315/185 R, 185 S, 192, 291, 294, 324; 362/226, 232, 240, 249, 250, 363, 800

[56] References Cited

U.S. PATENT DOCUMENTS

| 3,622,947 | 11/1971 | Griffin | 439/615 |
| 3,795,830 | 3/1974 | Richardson | 327/514 |
| 3,869,641 | 3/1975 | Goldberg | 315/135 |
| 4,211,955 | 7/1980 | Ray | 315/53 |
| 4,298,869 | 11/1981 | Okuno | 345/82 |
| 4,574,217 | 3/1986 | Pendergrass | 313/318.03 |
| 4,630,183 | 12/1986 | Fujita | 362/311 |
| 4,727,289 | 3/1988 | Uchida | 315/71 |
| 4,929,866 | 5/1990 | Murata | 313/500 |
| 5,036,248 | 7/1991 | McEwan | 313/500 |
| 5,041,955 | 8/1991 | Devir et al. | 313/318.09 |
| 5,160,201 | 11/1992 | Wrobel | 362/249 |
| 5,463,280 | 10/1995 | Johnson | 362/800 |

Primary Examiner—Denise Gromada
Assistant Examiner—Alan B. Cariaso
Attorney, Agent, or Firm—Richard J. Hicks

[57] ABSTRACT

A light emitting diode array mounted on a printed circuit board is provided with capacitive means to reduce voltage, mounted in a glass tube and provided with a standard candelabra or other base for insertion into a light socket in a slim line exit or other sign. In a preferred embodiment the circuit board is rotatable relative to the metal base so as to facilitate maximum light emission from the sign.

4 Claims, 3 Drawing Sheets

LIGHT EMITTING DIODE LAMP

FIELD OF INVENTION

This invention relates to a light emitting diode (LED) lamp and more particularly to an LED lamp for use in slim line exit signs.

BACKGROUND OF INVENTION

Solid state light sources, such as LEDs, are well known in the art and attention is directed, for example to U.S. Pat. Nos. 4,211,955, 4,298,869 and 3,869,641. Generally such lamps include an LED array, circuitry means, an enclosing glass envelope and a screw or bayonet base. In most instances the electronic circuit includes a rectifier and regulating means which result in energy losses and a considerable problem of heat dissipation, so that special attention has been paid to this by designing specially shaped series resistors (see U.S. Pat. Nos. 4,727,289 and 5,036,248). In U.S. Pat. No. 3,869,641, the heat dissipation problem is addressed by using a capacitive system to provide the necessary AC voltage drop in a pilot light system having opposed LEDs. There is a need, therefore, for an improved LED lamp which includes a plurality of LEDs in parallel and yet is small enough to be used as reliable light source in applications such as slimline exit lights, where there is little or no ventilation and heat dissipation is difficult and must, therefore be minimized. Such arrays of LEDs are, of course, very directional in their light output and adjusting means should preferably be provided so that the array can be directed in the most advantageous manner.

OBJECT OF INVENTION

An object of the present invention is to provide an LED array lamp for use in exit lights and the like. Another object is to provide an adjustable LED array lamp having a directional light display.

BRIEF STATEMENT OF INVENTION

By one aspect of this invention there is provided a light emitting diode (LED) lamp assembly comprising: at least two LEDs connected in parallel with opposite polarity, each of said LEDs generating light when properly forwardly biased, including capacitive means to limit voltage drop across said diodes and mounted on a substantially rigid base; means to connect said LEDs to an AC power source and means to secure said rigid base thereto; and light transmissive cover means, adapted to receive said rigid base, and mountable on said means to connect said LEDs to said power source.

By another aspect of this invention there is provided an LED lamp assembly comprising: a first plurality of LEDs connected in series with each other and in parallel with a second plurality of LEDs with opposite polarity connected in series so that each of said LEDs generate light when properly forwardly biased and including capacitive means to reduce voltage drop across said LEDs; a rigid base means having said LEDs mounted thereon; metal base means to connect said LEDs to an AC power source; a light transmissive cover means adapted to receive and contain rigid base and said LEDs mounted thereon; and insulating means intermediate said cover means and said metal base means, adapted to be received in said metal base means and to receive said cover means, so that said cover means and said rigid base may be rotated relative to said metal base means when in operative connection with said AC power source.

DETAILED DESCRIPTION OF PREFERRED EMBODIMENTS

Figure 1:
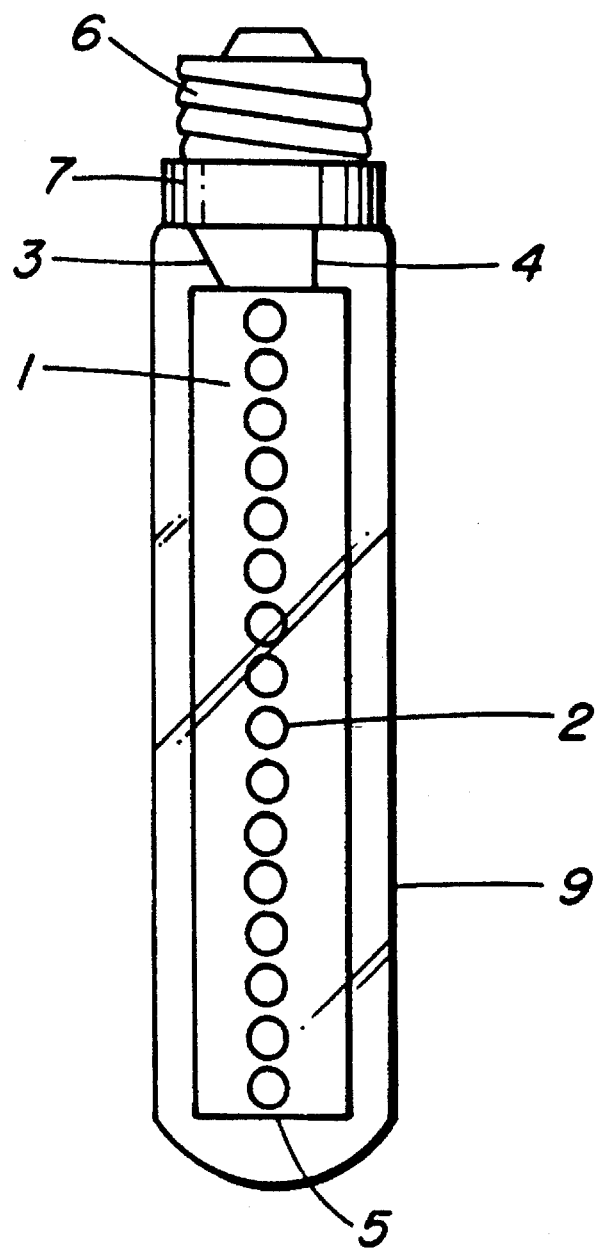
FIG. 1 is a side sectional view of one embodiment of the invention.
Figure 3:
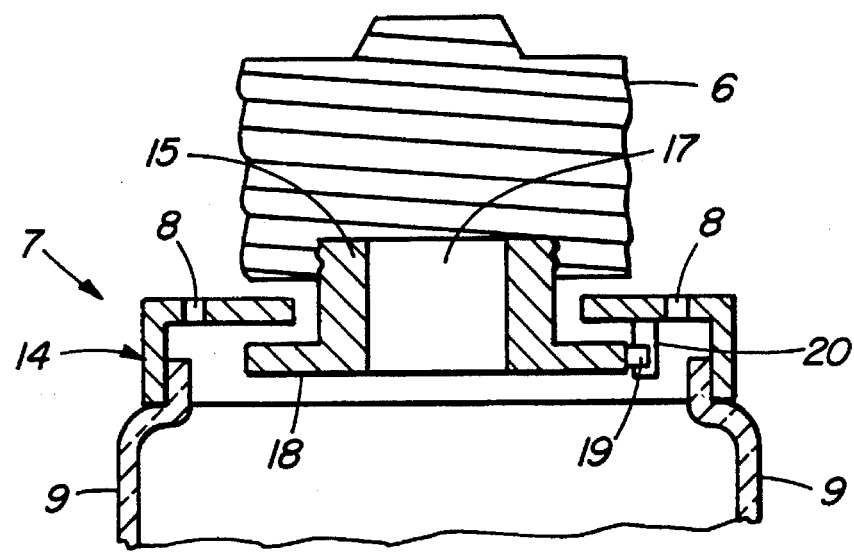
FIG. 3 is a side sectional view of the cap of FIG. 1.
Figure 4:
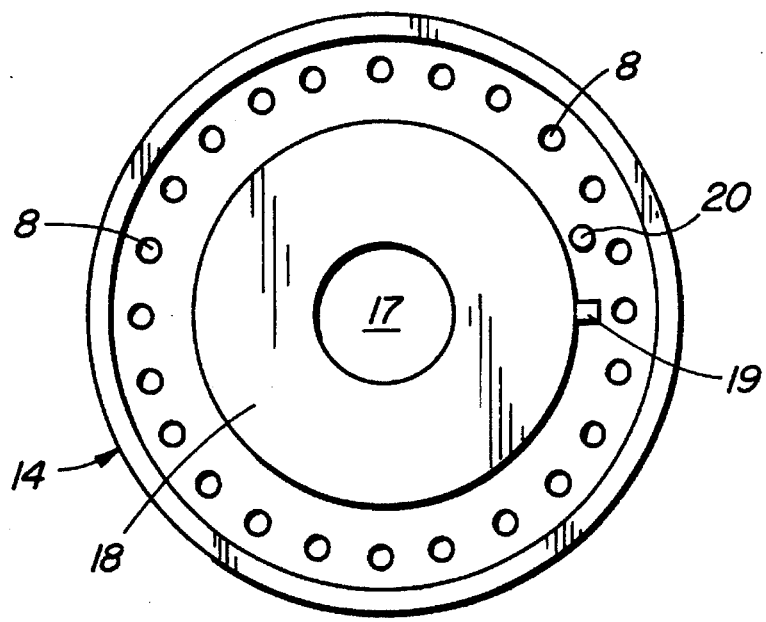
FIG. 4 is a bottom plan view of the cap of FIG. 3.

Referring to FIG. 1 there is shown a substantially rigid rectangular printed circuit board 1 having 16 green or red LEDs 2 mounted along the longitudinal axis thereof in electrical series with each other, as described in more detail herein after with reference to FIG. 2. It will be appreciated that the arrangement of the LEDs 2 is a matter of convenience and in an alternative embodiment, LEDs may be arranged in at least two parallel rows on one side of board 1 or, alternatively in one or more rows on both sides of the board. In addition, two or more boards may be angularly oriented to each other in longitudinal relationship. Current carrying wires 3 and 4 extend from end 5 of the board to electrical terminals in the metal base 6, which is preferably a conventional candelabra screw base, but which may be a large base, or may be a bayonet-type base. Intermediate board 1 and base 6 there is provided an insulating cap member 7, preferably having a plurality of circumferentially spaced air holes 8 as shown in FIGS. 3 and 4. Board 1 and LEDs 2 are contained within a glass tube which is secured to cap 7, preferably with an epoxy glue. Preferably glass tube 9 is a frosted glass tube for maximum light diffusion. It should be particularly noted that tube 9 is not evacuated as in a conventional light bulb but is open to the atmosphere via holes 8 which facilitate heat removal.

Figure 2:
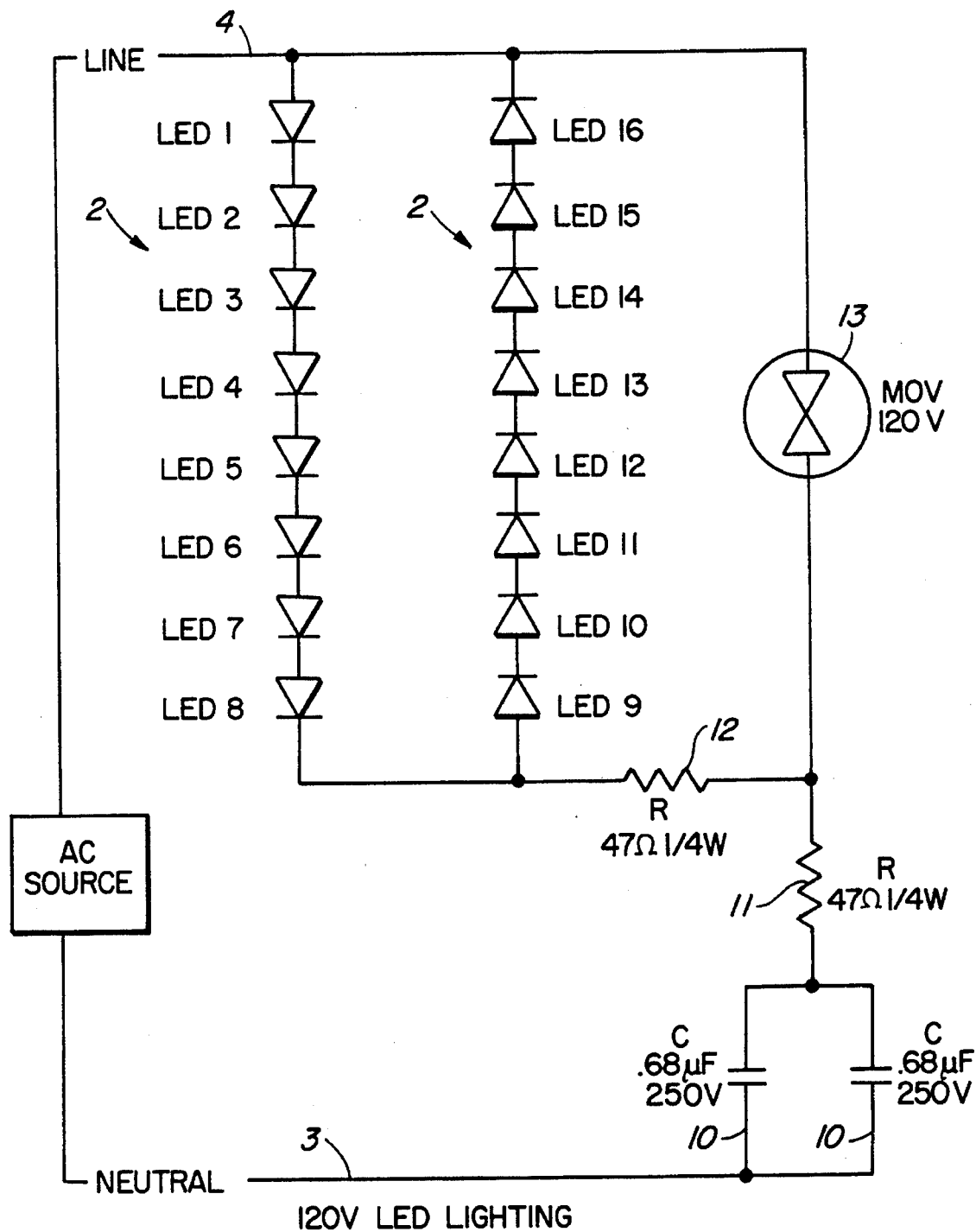
FIG. 2 is a schematic circuit diagram for the device of FIG. 1.

A typical circuit diagram is illustrated in FIG. 2, wires 3 and 4 are connected, via base 6 to an AC source (not shown), and connect LED 1 to LED 8 in series and in parallel with LED 9 to LED 16 with opposite polarity. The LEDs are further connected in series with voltage absorbing capacitors 10, and resistors 11, 12 so that when properly forwardly biased each of the diodes generates light, The circuit also includes a surge suppresser 13 to limit line voltage through the LEDs. It will be appreciated that wires 3 and 4 are preferably long enough so that the ends thereof can be soldered to respective terminals in base 6 without overheating the printed circuit board, and to simplify assembly.

In the device thus far described with reference to FIG. 1, it will be appreciated that the orientation of the planar surface of board 1 relative to the start of the screw thread in base 6 is somewhat random when cap 7 is glued to the tube 8. The light output from a longitudinal row of LEDs is necessarily very directional and when such a device is screwed into an existing exit sign box socket, it is not generally possible to predict the angle of the LEDs will form with the indicia or the sign box. It is, therefore preferable that the circuit board 1 shall be rotatable relative to metal base 6. This can be effected most simply by fabricating cap 7 in two parts 14, 15, as shown more clearly in FIGS. 3 and 4. Upper cap portion 14 is adapted to engage tube 9 and is provided with airholes 8 and a central bore 16. Lower cap portion 15 is provided with a hollow central boss 17, through which wires 3,4 may pass axially, and a lower flange member 18 having a diameter slightly greater than bore 16 in upper cap portion 14. A key stop 19 is provided on the radial edge of flange 18, and a stop peg 20 is provided on upper cap portion 14. In assembly boss 17 is inserted through bore 16 and metal base 6 is crimped thereto. Wires 3,4 are passed through boss 17 and electrically secured to base 6. Circuit board 1 is press fitted into boss 17 and upper cap portion 14 is then adhesively secured to glass tube 9. When base 6 is screwed into an electrical socket (not shown), glass tube 9 can be rotated either clockwise or anti-clockwise as desired until key 19 engages stop 20, so as to align the LEDs for maximum light in the sign.

I claim

1. A light emitting diode lamp assembly comprising: a first plurality of light emitting diodes connected in series with each other and in parallel with a second plurality of light emitting diodes with opposite polarity connected in series so that each of said light emitting diodes generate light when properly forwardly biased and including capacitive means to reduce voltage drop across said light emitting diodes; a rigid base means having said light emitting diodes mounted thereon; metal base means to connect said light emitting diodes to an AC power source; a light transmissive cover means adapted to receive and contain said rigid base means and said light emitting diodes mounted thereon; and insulating means intermediate said cover means and said metal base means, adapted to be received in said metal base means and to receive said cover means, so that said cover means and said rigid base means may be rotated relative to said metal base means when in operative connection with said AC power source, and wherein said insulating means comprises a first cap portion adapted to receive said cover means and including a central bore, a second cap portion including a hollow boss adapted to be slidingly inserted through said central bore and an axially aligned flange portion for rotatable planar engagement with said first cap portion, and means to secure said boss to said metal base means.

2. A light emitting diode lamp assembly as claimed in claim 1 wherein said metal base means comprises a screw threaded candelabra base.

3. A light emitting diode lamp assembly as claimed in claim 1 wherein said light transmissive cover means comprises a glass tube closed at a distal end thereof.

4. A light emitting diode lamp assembly as claimed in claim 3 wherein said glass tube comprises a frosted glass tube.

* * * * *